US009085875B2

(12) United States Patent
Ku

(10) Patent No.: US 9,085,875 B2
(45) Date of Patent: Jul. 21, 2015

(54) HYDRAULIC CONTROL VALVE FOR CONSTRUCTION MACHINERY

(75) Inventor: Bon Seuk Ku, Changwon-si (KR)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 175 days.

(21) Appl. No.: 13/640,624

(22) PCT Filed: May 17, 2010

(86) PCT No.: PCT/KR2010/003096
§ 371 (c)(1), (2), (4) Date: Oct. 11, 2012

(87) PCT Pub. No.: WO2011/145755
PCT Pub. Date: Nov. 24, 2011

(65) Prior Publication Data

US 2013/0025720 A1 Jan. 31, 2013

(51) Int. Cl.
*F16K 31/12* (2006.01)
*E02F 9/22* (2006.01)
*F15B 13/01* (2006.01)

(52) U.S. Cl.
CPC ............. *E02F 9/2267* (2013.01); *F15B 13/015* (2013.01)

(58) Field of Classification Search
CPC ............. F15B 13/015; F15B 2013/008; E02F 9/2267; E02F 9/2271; E02F 9/2264; B66F 9/22
USPC .............. 137/491, 489.5, 492, 487, 488, 489, 137/492.5, 596.14, 599.01; 91/445, 447, 91/436
See application file for complete search history.

(56) References Cited

U.S. PATENT DOCUMENTS 6,371,006 B1 * 4/2002 Goto et al. ...................... 91/445
2005/0183571 A1 * 8/2005 Cheong .......................... 91/516
2008/0053538 A1 * 3/2008 Jeon ........................ 137/596.16
2009/0101854 A1 * 4/2009 Jeon ............................... 251/63

(Continued)

FOREIGN PATENT DOCUMENTS

CN 101135324 A 3/2008
DE 19956717 A1 6/2000

(Continued)

OTHER PUBLICATIONS

Preliminary Examination Report by IPEA dated Dec. 14, 2011 for PCT/KR2010/003096.

(Continued)

*Primary Examiner* — Jessica Cahill
(74) *Attorney, Agent, or Firm* — Lowe Hauptman & Ham, LLP

(57) ABSTRACT

A hydraulic control valve for a construction machine is disclosed, which can variably control the flow of hydraulic fluid that is supplied to a hydraulic cylinder to drive a working device. The hydraulic control valve for a construction machine includes a valve block in which an inlet port and an outlet port that communicates with the inlet port is formed, a check valve provided with a first throttling portion to permit the flow of the hydraulic fluid from the inlet port to the outlet port and to variably control the flow of the hydraulic fluid from the outlet port to the inlet port, and a spool provided with a second throttling portion to variably control the flow of the hydraulic fluid from the outlet port to the inlet port through the check valve that is opened when the second throttling portion is shifted by pilot signal pressure.

3 Claims, 8 Drawing Sheets

(56) References Cited

U.S. PATENT DOCUMENTS

| | | | | |
|---|---|---|---|---|
| 2009/0242050 | A1* | 10/2009 | Matsuzaki et al. ............ | 137/596 |
| 2009/0282825 | A1* | 11/2009 | Oosima ........................... | 60/459 |

FOREIGN PATENT DOCUMENTS

| | | | | |
|---|---|---|---|---|
| EP | 1143151 | A1 | * | 10/2001 |
| EP | 1227249 | A1 | | 7/2002 |
| EP | 1961973 | A1 | * | 8/2008 |
| JP | 06193604 | A | | 7/1994 |
| JP | 10-196607 | A1 | | 7/1998 |
| JP | 2004353859 | A | | 12/2004 |
| JP | 2006336870 | A | | 12/2006 |
| JP | 2007162848 | A | | 6/2007 |
| JP | 2008057319 | A | | 3/2008 |
| KR | 10-0800081 | | | 2/2008 |
| KR | 10-0813559 | | | 3/2008 |
| KR | 10-2008-0055873 | | | 6/2008 |
| KR | 10-2008-0077007 | | | 8/2008 |

OTHER PUBLICATIONS

Written Opinion Report by ISA mailed Feb. 23, 2011 for PCT/KR2010/003096.

International Search Report mailed Feb. 23, 2011 for PCT/KR2010/003096.

China Office Action of CN 201080066408.9 mailed Jul. 23, 2014.

Japanese Office Action of JP 2013-511088 mailed Mar. 11, 2014.

European Search report of PCT/KR2010/003096 mailed Apr. 1, 2014.

* cited by examiner

HYDRAULIC CONTROL VALVE FOR CONSTRUCTION MACHINERY

TECHNICAL FIELD

The present invention relates to a hydraulic control valve for a construction machine on which a working device, such as a boom or an arm, is mounted. More particularly, the present invention relates to a hydraulic control valve for a construction machine, which can variably control the flow of hydraulic fluid that is supplied to a hydraulic cylinder to drive a working device.

BACKGROUND ART

A hydraulic control valve in the related art, as shown in FIGS. 1 to 3, includes a valve block B in which an inlet port P1 and an outlet port P2 that communicates with the inlet port P1 are formed; a first check valve C1 installed to open and close an intersection portion of a path 1 (1) communicating with the inlet port P1 and a path 4 (4) communicating with the outlet port P2, the first check valve C1 permitting a flow of hydraulic fluid from the path 1 (1) to the path 4 (4) and limiting a flow of the hydraulic fluid from the path 4 (4) to the path 1 (1); a second check valve C2 installed to open and close an intersection portion of a path 3 (3) communicating with the path 4 (4) and a path 2 (2) communicating with the path 1 (1), the second check valve C2 permitting a flow of the hydraulic fluid from the path 2 (2) to the path 3 (3) and limiting a flow of the hydraulic fluid from the path 3 (3) to the path 2 (2); and a spool S slidingly coupled to the valve block B to control the flow of the hydraulic fluid from the outlet port P2 to the inlet port P1 through the second check valve C2 that is opened when the spool S is shifted by pilot signal pressure Pi.

In the drawings, the reference numeral R denotes a relief valve that protects a hydraulic circuit by feeding the hydraulic fluid that corresponds to excessive pressure back to a hydraulic tank T when pressure that exceeds a predetermined pressure is generated in the path 4 (4).

According to the hydraulic control valve in the related art, the hydraulic fluid that is supplied to the inlet port P1 flows to the outlet port P2 through the path 1 (1), the first check valve C1, and the path 4 (4) in order.

At this time, since the first check valve C1 is maintained in a closed state by the pressure in the back pressure chamber 5 of the first check valve C1 and the elastic force of a spring 10, the hydraulic fluid does not flow from the path 3 (3) to the path 2 (2).

On the other hand, if the spool S is shifted upward as shown in FIG. 1 according to the supply of the pilot signal pressure Pi (in FIG. 3, the spool S is shifted to the right side by the pilot signal pressure Pi), a path b (8) communicates with a path c (9) formed on the spool S, and thus the pressure in the back pressure chamber 6 of the second check valve C2 becomes equal to the pressure of the inlet port P1.

At this time, since the pressure of the path 3 (3) becomes higher than the pressure of the back pressure chamber 6, the second check valve C2 is shifted to the right side as shown in FIG. 1 (in FIG. 3, the second check valve C2 is shifted upward by the pressure of the path 3 (3)). Through this, the path 2 (2) that communicates with the path 3 (3) communicates with the path 1 (1) through the spool S shifted upward.

Accordingly, the hydraulic fluid in the outlet port P2 is supplied to the path 1 (1) that communicates with the inlet port P1 through the path 4 (4), the path 3 (3), the path 2 (2), and the spool S in order.

As described above, in the case of controlling the flow of the hydraulic fluid from the outlet port P2 to the inlet port P1 of the hydraulic control valve by the pilot signal pressure Pi, a large-size spool S that is shifted by the pilot signal pressure Pi is required so that the pressure of the back pressure chamber 6 of the second check valve C2 can be controlled and the hydraulic fluid can flow from the inlet port P1 to the outlet port P2 with a small loss of pressure.

Due to this, since the hydraulic control valve that is coupled to the large-size spool is large-sized, the manufacturing cost is increased to weaken the competitive power, and the work to mount the large-sized control valve on the hydraulic cylinder becomes difficult to cause inconvenience in manufacturing the hydraulic control valve.

DISCLOSURE

Technical Problem

Therefore, the present invention has been made to solve the above-mentioned problems occurring in the related art, and one embodiment of the present invention is related to a hydraulic control valve for a construction machine, which can minimize the number of hydraulic components that constitute a control valve for controlling hydraulic fluid supplied to a hydraulic cylinder so as to drive a working device, so that the manufacturing cost can be reduced and the control valve can be easily mounted on the hydraulic cylinder or the like.

Technical Solution

In accordance with a first aspect of the present invention, there is provided a hydraulic control valve for a construction machine that controls hydraulic fluid supplied to a hydraulic cylinder to drive a working device, which includes a valve block in which an inlet port and an outlet port that communicates with the inlet port is formed; a check valve installed to open and close the intersection portion of a path 1 communicating with the inlet port and a path 2 communicating with the outlet port, and provided with a first throttling portion to permit a flow of the hydraulic fluid from the inlet port to the outlet port and to variably control a flow of the hydraulic fluid from the outlet port to the inlet port; and a spool slidingly coupled to the valve block, and provided with a second throttling portion to variably control the flow of the hydraulic fluid from the outlet port to the inlet port through the check valve that is opened when the spool is shifted by pilot signal pressure.

In accordance with a second aspect of the present invention, there is provided a hydraulic control valve for a construction machine that controls hydraulic fluid supplied to a hydraulic cylinder to drive a working device, which includes a valve block in which an inlet port and an outlet port that communicates with the inlet port is formed; a check valve installed to open and close an intersection portion of a path 1 communicating with the inlet port and a path 2 communicating with the outlet port, and provided with a first throttling portion to permit a flow of the hydraulic fluid from the inlet port to the outlet port and to variably control the flow of the hydraulic fluid from the outlet port to the inlet port; a first check valve formed in the check valve to make the flow of the hydraulic fluid from the inlet port to the outlet port smooth; and a spool slidingly coupled to the valve block, and provided with a second throttling portion to variably control the flow of the hydraulic fluid from the outlet port to the inlet port through the check valve that is opened when the spool is shifted by pilot signal pressure.

In accordance with a third aspect of the present invention, there is provided a hydraulic control valve for a construction machine that controls hydraulic fluid supplied to a hydraulic cylinder to drive a working device, which includes a valve block in which an inlet port and an outlet port that communicates with the inlet port is formed; a check valve installed to open and close an intersection portion of a path 1 communicating with the inlet port and a path 2 communicating with the outlet port, and provided with a first throttling portion to permit a flow of the hydraulic fluid from the inlet port to the outlet port and to variably control the flow of the hydraulic fluid from the outlet port to the inlet port; a second check valve installed in a branch path that is branch-connected to the path 1 and the path 2 to make the flow of the hydraulic fluid from the inlet port to the outlet port smooth; and a spool slidingly coupled to the valve block, and provided with a second throttling portion to variably control the flow of the hydraulic fluid from the outlet port to the inlet port through the check valve that is opened when the spool is shifted by pilot signal pressure.

In accordance with the aspects of the present invention, the hydraulic control valve for a construction machine may further include a third throttling portion formed in the check valve to variably control the flow of the hydraulic fluid from the outlet port to the inlet port, wherein the third throttling portion controls the hydraulic fluid that flows from the path 2 to the path 1 to correspond to an amount of spool shift.

Advantageous Effect

As described above, according to the hydraulic control valve and according to the aspects of the present invention, the following advantages can be obtained.

Since the hydraulic control valve for a construction machine which controls the hydraulic fluid that is supplied to the hydraulic cylinder to drive a working device is constructed with the minimum number of hydraulic components, the manufacturing cost can be reduced to heighten the price competitiveness, and the control valve can be easily mounted on the hydraulic cylinder or the like.

BRIEF DESCRIPTION OF THE DRAWINGS

The above objects, other features and advantages of the present invention will become more apparent by describing the preferred embodiments thereof with reference to the accompanying drawings, in which.

DESCRIPTION OF REFERENCE NUMERALS IN THE DRAWING

Figure 1:
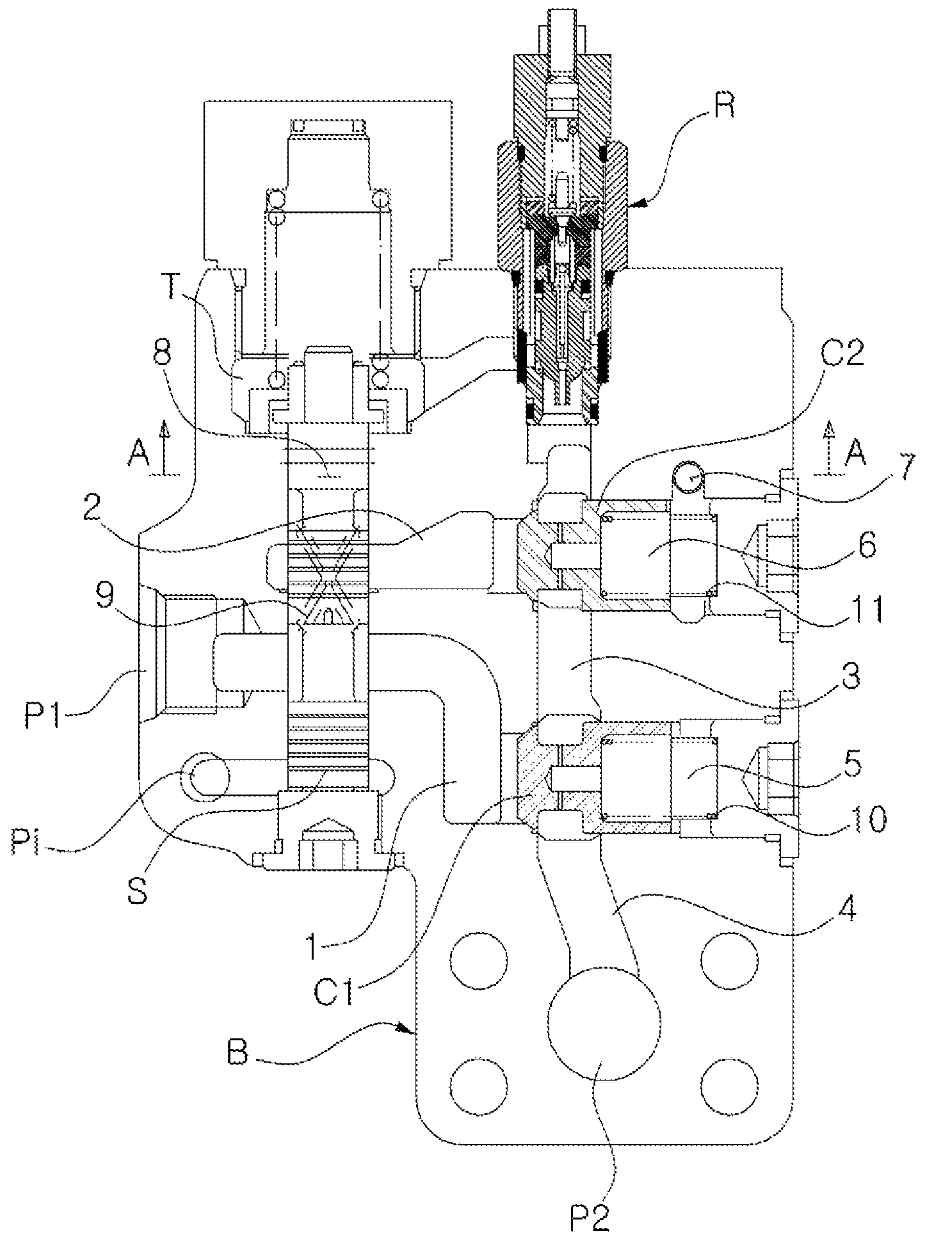
FIG. 1 Prior Art
FIG. 1 is a cross-section view of a hydraulic control valve for a construction machine in the related art.
Figure 2:
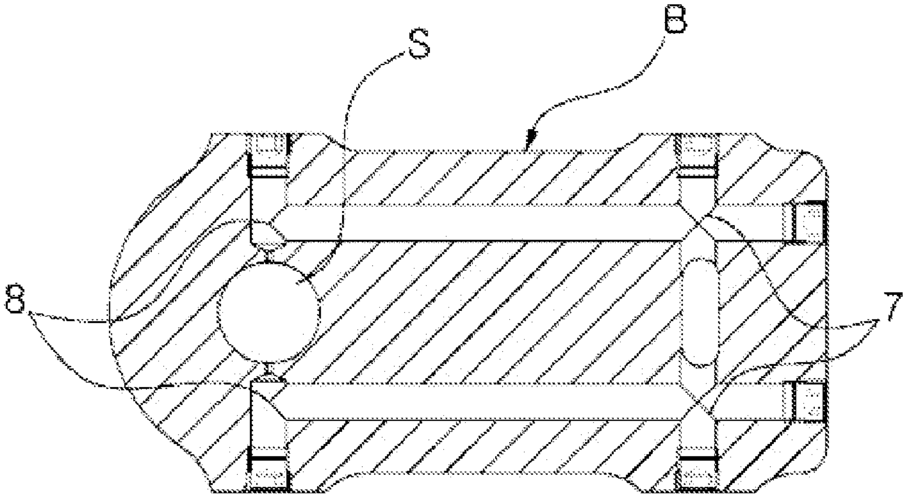
FIG. 2 Prior Art
FIG. 2 is a cross-sectional view taken along line A-A in FIG. 1.
Figure 3:
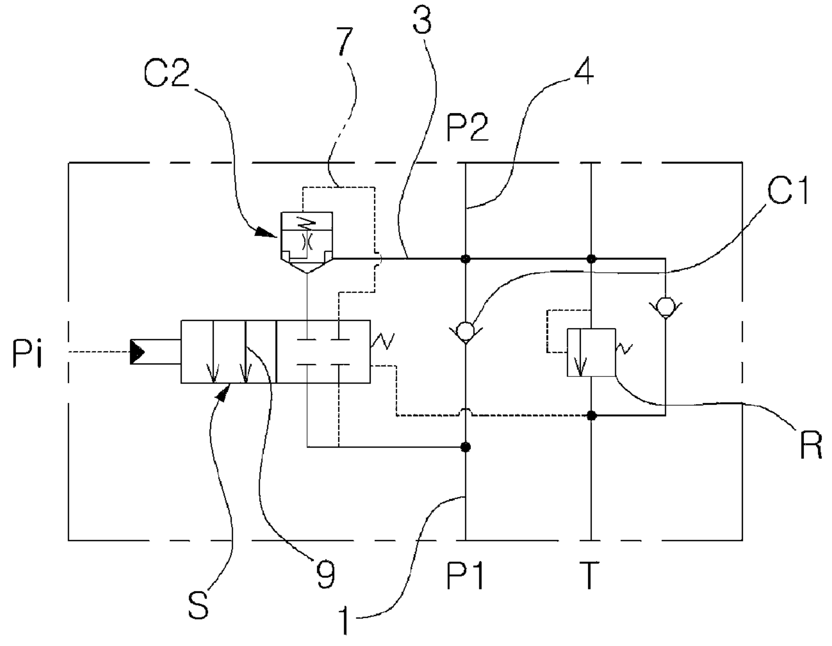
FIG. 3 Prior Art
FIG. 3 is a hydraulic circuit diagram of a hydraulic control valve for a construction machine in the related art.

50: inlet port
51: outlet port
52: valve block
53: path 1
54: path 2
55: first throttling portion
56: check valve
57: second throttling portion
58: spool
59: third throttling portion
60: first check valve
61: branch path
62: second check valve

BEST MODE

Now, preferred embodiments of the present invention will be described in detail with reference to the accompanying drawings. The matters defined in the description, such as the detailed construction and elements, are only specific details provided to assist those of ordinary skill in the art in a comprehensive understanding of the invention, and the present invention is not limited to the embodiments disclosed hereinafter.

Figure 4:
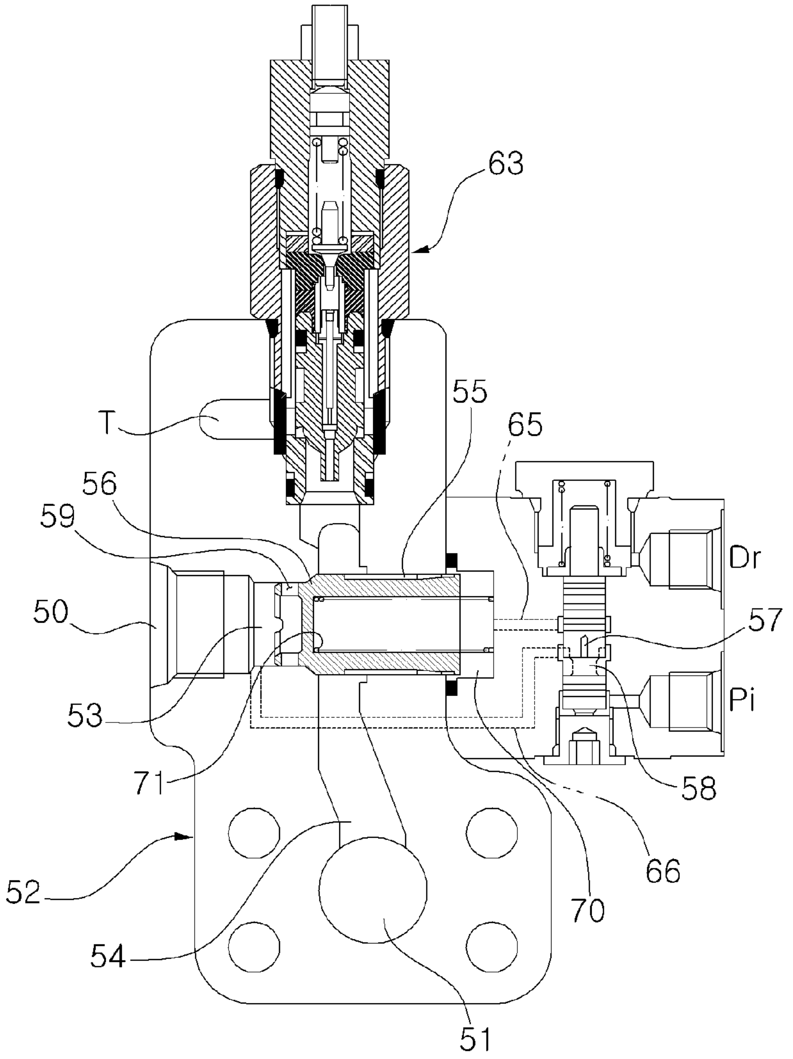
FIG. 4 is a cross-sectional view of a hydraulic control valve for a construction machine according to first embodiment of the present invention.
Figure 5:
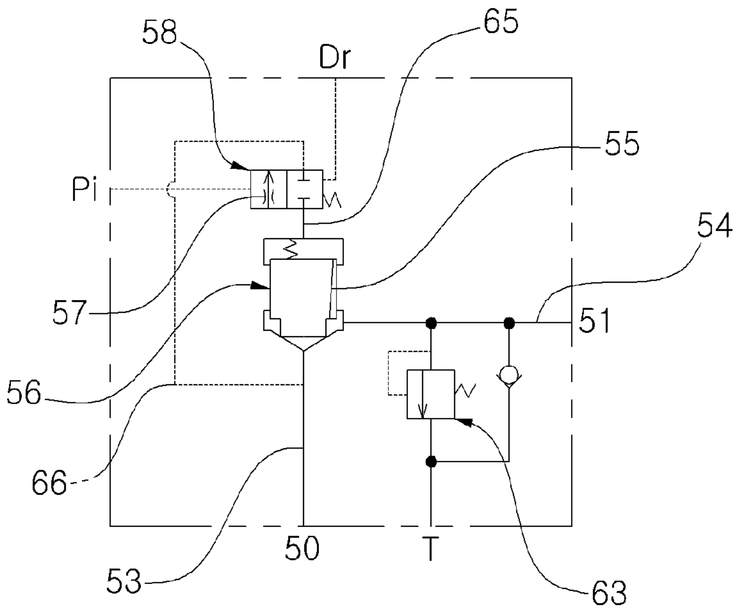
FIG. 5 is a hydraulic circuit diagram of a hydraulic control valve for a construction machine according to the first embodiment of the present invention.
Figure 10:
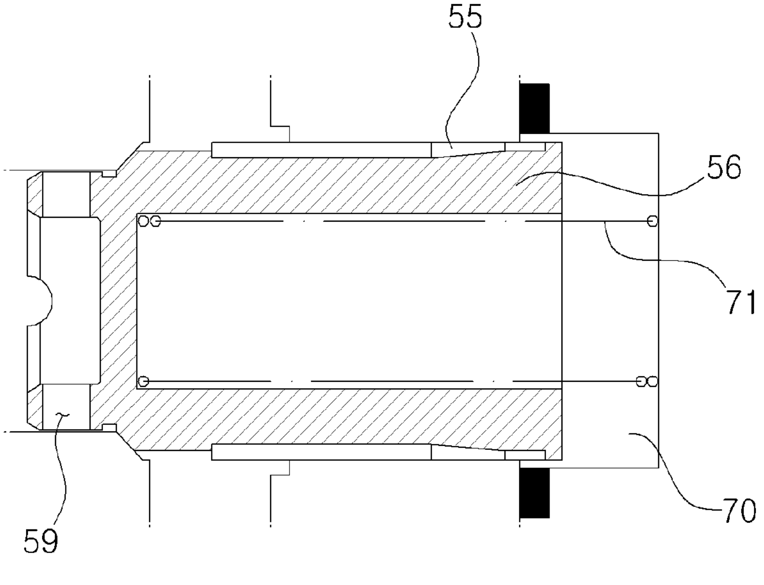
FIG. 10 is a detailed view of a check valve in a hydraulic control valve for a construction machine according to an embodiment of the present invention.

According to the first embodiment of the present invention as illustrated in FIGS. 4, 5, and 10, a hydraulic control valve for a construction machine that controls hydraulic fluid supplied to a hydraulic cylinder (boom cylinder) to drive a working device, such as a boom or an arm, includes a valve block 52 in which an inlet port 50 and an outlet port 51 that communicates with the inlet port 50 are formed; a check valve 56 installed to open and close an intersection portion of a path 1 53 communicating with the inlet port 50 and a path 2 54 communicating with the outlet port 51, and provided with a first throttling portion 55 to permit a flow of the hydraulic fluid from the inlet port 50 to the outlet port 51 and to variably control a flow of the hydraulic fluid from the outlet port 51 to the inlet port 50; and a spool 58 slidingly coupled to the valve block 52, and provided with a second throttling portion 57 to variably control the flow of the hydraulic fluid from the outlet port 51 to the inlet port 50 through the check valve 56 that is opened when the spool 58 is shifted by pilot signal pressure.

The hydraulic control valve for a construction machine may further include a third throttling portion 59 formed in the check valve 56 to variably control the flow of the hydraulic fluid from the outlet port 51 to the inlet port 50, wherein the third throttling portion 59 controls the hydraulic fluid that flows from the path 2 54 to the path 1 53 to correspond to an amount of spool shift.

In the drawings, the reference numeral 63 denotes a relief valve that maintains constant pressure by feeding the hydraulic fluid that corresponds to excessive pressure back to a hydraulic tank T when pressure that exceeds a predetermined pressure is generated in the path 2 54.

Hereinafter, the operation of the hydraulic control valve for a construction machine according to the first embodiment of the present invention will be described.

As shown in FIGS. 4, 5, and 10, since a back pressure chamber 70 to which the check valve 56 is slidingly coupled and the path 2 54 communicate with each other by the first throttling portion 55, the check valve 56 is pushed to the right side if the pressure of the path 1 53 is higher than the pressure of the path 2 54, and the hydraulic fluid that is supplied to the inlet port 50 can flow to the outlet port 51.

On the other hand, the flow of the hydraulic fluid from the outlet port 51 to the inlet port 50 may be controlled by the spool 58 depending on the supply of the pilot signal pressure Pi. In the initial stage where the pilot signal pressure Pi is not applied to the spool 58, the check valve 56 is maintained in a closed state by the elastic force of a spring 71 and the pressure of the back pressure chamber 70 (in FIG. 4, the check valve 56 is seated to the left side). Because of this, the flow of the hydraulic fluid from the path 2 54 to the path 1 53 is not permitted.

If the pilot signal pressure Pi is applied to shift the spool 58 upward (in FIG. 6, the spool 58 is shifted to the right side), the path 3 65, which communicates with the back pressure chamber 70, communicates with the second throttling portion 57 of the spool 58, and then communicates with the path 1 53 through the path 4 66.

At this time, since the path 1 53 in a lower pressure state and the pressure of the back pressure chamber 70 is lowered, the check valve 56 moves to the right side (in FIG. 5, the check valve 56 moves upward). Accordingly, the hydraulic fluid of the outlet port 51 flows to the inlet port 50 through the path 2 54, the open check valve 56, and the path 1 53 in order.

At this time, if the check valve 56 moves to the right side as shown in FIG. 10, the first throttling portion 55 formed on the check valve 56 forms a variable throttling portion. Further, if the spool 58 moves upward as shown in FIG. 4, the second throttling portion 57 formed on the spool 58 forms a variable throttling portion.

As described above, since the shift amount of the spool 58 is determined depending on the pilot signal pressure Pi, the position of the second throttling portion 57 is determined depending on the shift amount of the spool 58. Since the position of the right end of the check valve 58 is determined, the path 2 54 and the path 153 communicate with each other by the third throttling portion 59.

Through this, the flow of the hydraulic fluid from the outlet port 51 to the inlet port 50 can be variably controlled.

Figure 6:
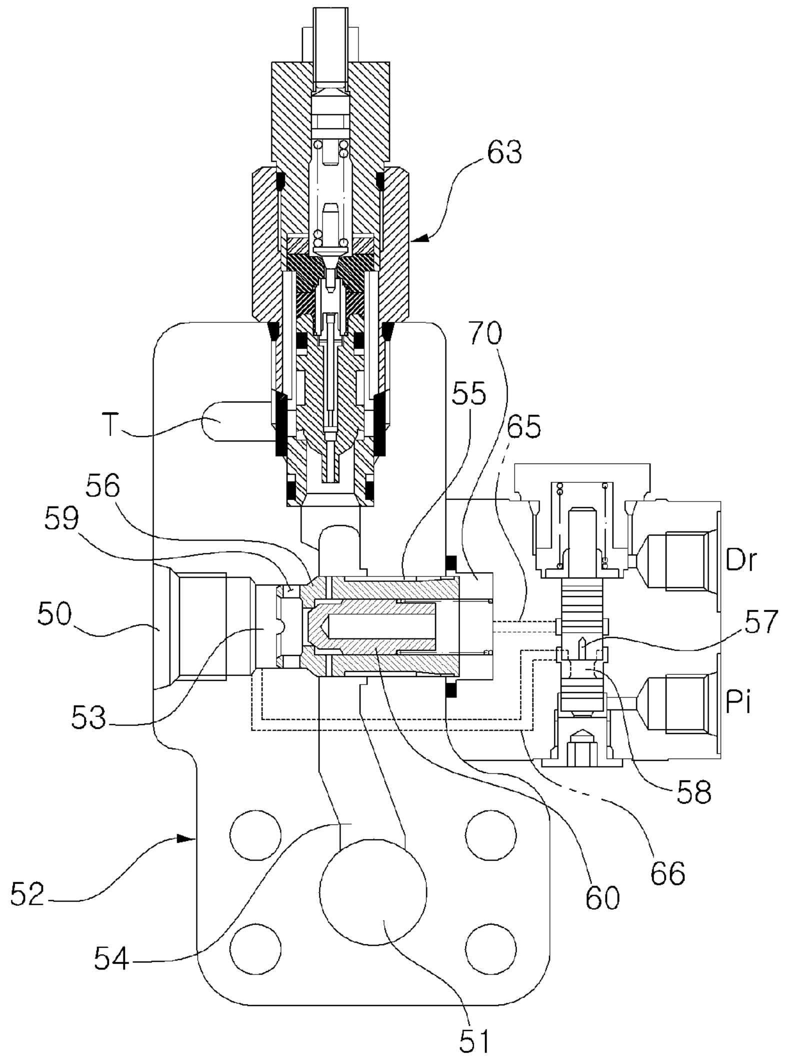
FIG. 6 is a cross-sectional view of a hydraulic control valve for a construction machine according to a second embodiment of the present invention.
Figure 7:
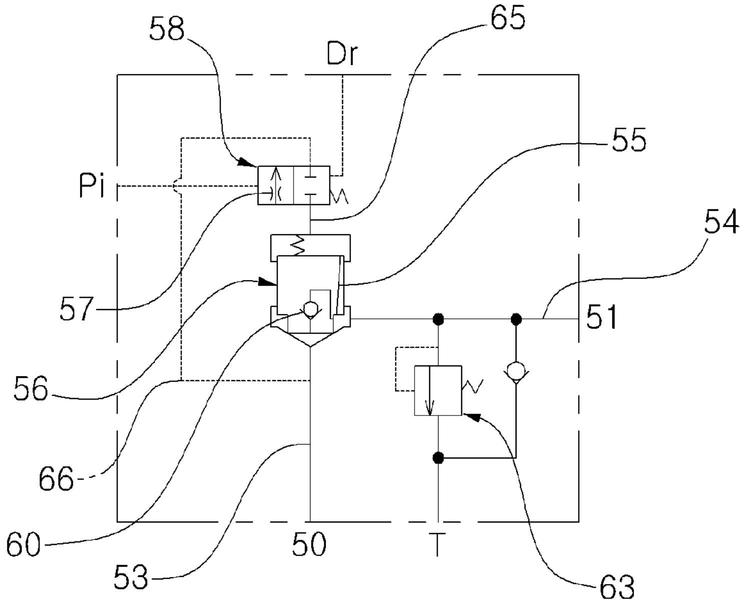
FIG. 7 is a hydraulic circuit diagram of a hydraulic control valve for a construction machine according to the second embodiment of the present invention.

According to the second embodiment of the present invention as illustrated in FIGS. 6, 7, and 10, a hydraulic control valve for a construction machine that controls hydraulic fluid supplied to a hydraulic cylinder (boom cylinder) to drive a working device, such as a boom or an arm, includes a valve block 52 in which an inlet port 50 and an outlet port 51 that communicates with the inlet port 50 is formed; a check valve 56 installed to open and close an intersection portion of a path 1 53 communicating with the inlet port 50 and a path 2 54 communicating with the outlet port 51, and provided with a first throttling portion 55 to permit a flow of the hydraulic fluid from the inlet port 50 to the outlet port 51 and to variably control a flow of the hydraulic fluid from the outlet port 51 to the inlet port 50; a first check valve 60 of a built-in type is formed in the check valve 56 to make the flow of the hydraulic fluid from the inlet port 50 to the outlet port 51 smooth; and a spool 58 slidingly coupled to the valve block 52, and provided with a second throttling portion 57 to variably control the flow of the hydraulic fluid from the outlet port 51 to the inlet port 50 through the check valve 56 that is opened when the spool 58 is shifted by pilot signal pressure.

At this time, since the configuration, except for the first check valve 60 of the built-in type formed in the check valve 56 to make the flow of the hydraulic fluid from the inlet port 50 to the outlet port 51 smooth, is the same as the configuration of the hydraulic control valve according to the first embodiment of the present invention, the detailed explanation of the configuration and the operation thereof will be omitted, and the same reference numerals are given to the duplicate configurations.

Figure 8:
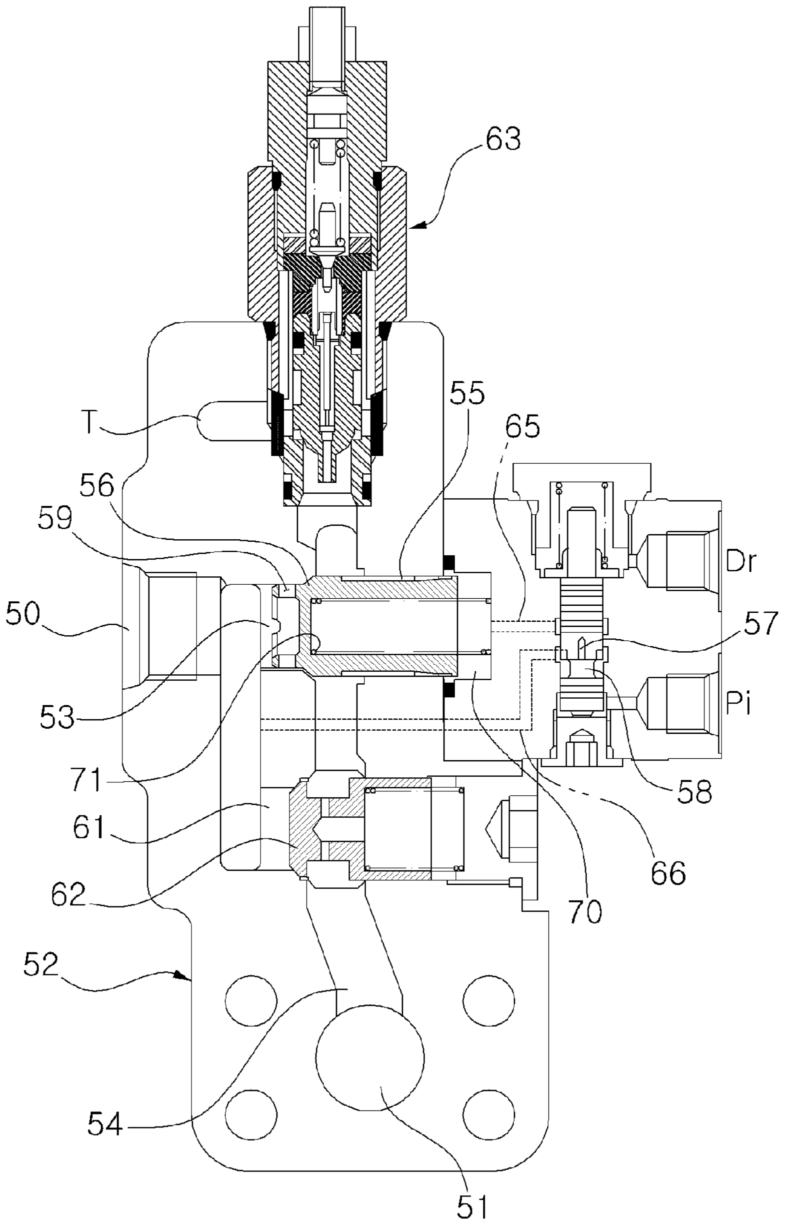
FIG. 8 is a cross-sectional view of a hydraulic control valve for a construction machine according to a third embodiment of the present invention.
Figure 9:
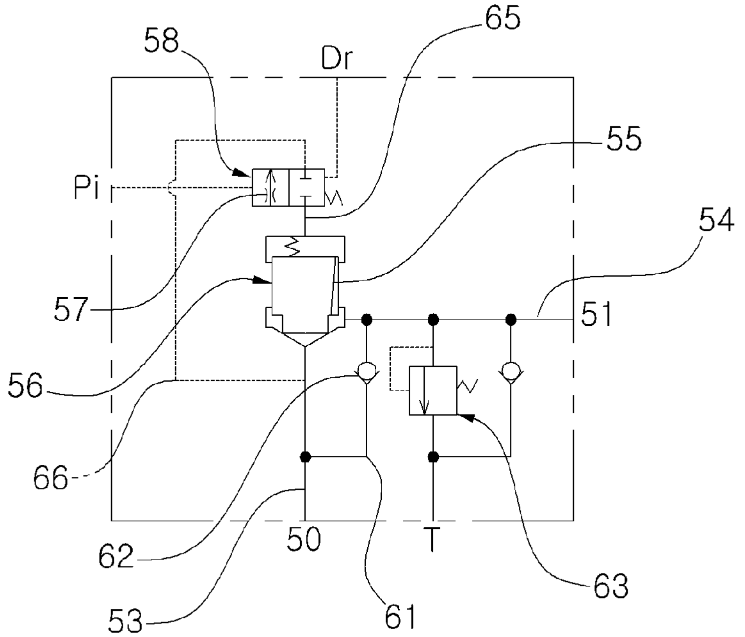
FIG. 9 is a hydraulic circuit diagram of a hydraulic control valve for a construction machine according to the third embodiment of the present invention.

According to the third embodiment of the present invention as illustrated in FIGS. 8 to 10, a hydraulic control valve for a construction machine that controls hydraulic fluid supplied to a hydraulic cylinder (boom cylinder) to drive a working device, such as a boom or an arm, includes a valve block 52 in which an inlet port 50 and an outlet port 51 that communicates with the inlet port 50 are formed; a check valve 56 installed to open and close an intersection portion of a path 1 53 communicating with the inlet port 50 and a path 2 54 communicating with the outlet port 51, and provided with a first throttling portion 55 to permit the flow of the hydraulic fluid from the inlet port 50 to the outlet port 51 and to variably control a flow of the hydraulic fluid from the outlet port 51 to the inlet port 50; a second check valve 62 installed in a branch path 61 that is branch-connected to the path 1 53 and the path 2 54 to make the flow of the hydraulic fluid from the inlet port 50 to the outlet port 51 smooth; and a spool 58 slidingly coupled to the valve block 52, and provided with a second throttling portion 57 to variably control the flow of the hydraulic fluid from the outlet port 51 to the inlet port 50 through the check valve 56 that is opened when the spool 58 is shifted by pilot signal pressure.

At this time, since the configuration, except for the second check valve 62 installed in the branch path 61 that is branch-connected to the path 1 53 and the path 2 54 to make the flow of the hydraulic fluid from the inlet port 50 to the outlet port 51 smooth, is the same as the configuration of the hydraulic control valve according to the first embodiment of the present invention, the detailed explanation of the configuration and the operation thereof will be omitted, and the same reference numerals are given to the duplicate configurations.

As described above, according to the hydraulic control valve for a construction machine that controls the hydraulic fluid supplied to the hydraulic cylinder to drive the working device, such as the boom, according to the embodiments of the present invention, the movement amount of the check valve is determined depending on the shift amount of the spool that corresponds to the pilot signal pressure, and the flow of the hydraulic fluid from the outlet port to the inlet port can be variably controlled depending on the movement amount of the check valve.

INDUSTRIAL APPLICABILITY

As apparent from the above description, according to the hydraulic control valve for a construction machine according to the embodiments of the present invention, since the hydraulic control valve which controls the hydraulic fluid that is supplied to the hydraulic cylinder to drive the working device is constructed with the minimum number of hydraulic components, the manufacturing cost can be reduced to heighten the price competitiveness, and the control valve can be easily mounted on the hydraulic cylinder or the like.

The invention claimed is:

1. A hydraulic control valve for a construction machine that controls hydraulic fluid supplied to a hydraulic cylinder to drive a working device, the hydraulic control valve comprising:

a valve block comprising:

an inlet port; and an outlet port configured to communicate with the inlet port;

a check valve configured to open and close an intersection portion of a first path communicating with the inlet port and a second path communicating with the outlet port, wherein the check valve comprises:

a first throttling portion configured to permit a flow of the hydraulic fluid from the inlet port to the outlet port, and variably control a flow of the hydraulic fluid from the outlet port to the inlet port;

a spool slidably coupled to the valve block, and comprising a second throttling portion configured to variably control the flow of the hydraulic fluid from the outlet port to the inlet port through the check, wherein the check valve is configured to be opened when the spool is shifted by pilot signal pressure; and a third throttling portion disposed in the check valve, and configured to variably control the flow of the hydraulic fluid from the outlet port to the inlet port, and control the hydraulic fluid that flows from the second path to the first path to correspond to an amount of spool shift of the spool.

2. A hydraulic control valve for a construction machine that controls hydraulic fluid supplied to a hydraulic cylinder to drive a working device, the hydraulic control valve comprising:

a valve block comprising:

an inlet port; and an outlet port configured to communicate with the inlet port;

a check valve configured to open and close an intersection portion of a first path communicating with the inlet port and a second path communicating with the outlet port, wherein the check valve comprises:

a first throttling portion configured to permit a flow of the hydraulic fluid from the inlet port to the outlet port, and variably control a flow of the hydraulic fluid from the outlet port to the inlet port;

a first check valve disposed in the check valve, and configured to make the flow of the hydraulic fluid from the inlet port to the outlet port; and a spool slidably coupled to the valve block, and comprising a second throttling portion configured to variably control the flow of the hydraulic fluid from the outlet port to the inlet port through the check valve, wherein the check valve is configured to be opened when the spool is shifted by pilot signal pressure; and a third throttling portion disposed in the check valve, and configured to variably control the flow of the hydraulic fluid from the outlet port to the inlet port, and control the hydraulic fluid that flows from the second path to the first path to correspond to an amount of spool shift.

3. A hydraulic control valve for a construction machine that controls hydraulic fluid supplied to a hydraulic cylinder to drive a working device, the hydraulic control valve comprising:

a valve block comprising:

an inlet port; and an outlet port configured to communicate with the inlet port;

a check valve configured to open and close an intersection portion of a first path communicating with the inlet port and a second path communicating with the outlet port, wherein the check valve comprises:

a first throttling portion configured to permit a flow of the hydraulic fluid from the inlet port to the outlet port, and variably control a flow of the hydraulic fluid from the outlet port to the inlet port;

a second check valve disposed in a branch path that is branch-connected to the first path and the second path, the second check valve configured to make the flow of the hydraulic fluid from the inlet port to the outlet port; and a spool slidably coupled to the valve block, and comprising a second throttling portion configured to variably control the flow of the hydraulic fluid from the outlet port to the inlet port through the check valve, wherein the check valve is configured to be opened when the spool is shifted by pilot signal pressure; and a third throttling portion disposed in the check valve, and configured to variably control the flow of the hydraulic fluid from the outlet port to the inlet port, and control the hydraulic fluid that flows from the second path to the first path to correspond to an amount of spool shift.

* * * * *